(12) United States Patent
Ogawa et al.

(10) Patent No.: US 12,070,864 B2
(45) Date of Patent: Aug. 27, 2024

(54) ROBOT CONTROL SYSTEM, ROBOT CONTROL METHOD, AND RECORDING MEDIUM

(71) Applicant: NEC Corporation, Tokyo (JP)

(72) Inventors: Masatsugu Ogawa, Tokyo (JP); Hisaya Wakayama, Tokyo (JP); Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 244 days.

(21) Appl. No.: 17/633,284

(22) PCT Filed: Aug. 22, 2019

(86) PCT No.: PCT/JP2019/032847
§ 371 (c)(1),
(2) Date: Feb. 7, 2022

(87) PCT Pub. No.: WO2021/033315
PCT Pub. Date: Feb. 25, 2021

(65) Prior Publication Data
US 2022/0281105 A1    Sep. 8, 2022

(51) Int. Cl.
*B25J 9/16* (2006.01)
*G06Q 30/0283* (2023.01)

(52) U.S. Cl.
CPC ............. *B25J 9/1661* (2013.01); *B25J 9/163* (2013.01); *B25J 9/1666* (2013.01); *G06Q 30/0283* (2013.01)

(58) Field of Classification Search
CPC ........ B25J 9/1661; B25J 9/163; B25J 9/1666; G06Q 30/0283
See application file for complete search history.

(56) References Cited

U.S. PATENT DOCUMENTS

| | | |
|---|---|---|
| 9,925,662 B1 | 3/2018 | Jules et al. |
| 10,173,319 B1 | 1/2019 | Jules et al. |
| 2002/0138359 A1 | 9/2002 | Noma |
| 2009/0234783 A1 | 9/2009 | Hamagami et al. |

(Continued)

FOREIGN PATENT DOCUMENTS

| | | |
|---|---|---|
| JP | H09-081205 A | 3/1997 |
| JP | 2001-250045 A | 9/2001 |

(Continued)

OTHER PUBLICATIONS

JP Office Action for JP Application No. 2021-540609, mailed on Mar. 14, 2023 with English Translation.

(Continued)

*Primary Examiner* — Behrang Badii
*Assistant Examiner* — Jay Khandpur (57) ABSTRACT

In a robot control system, a storage unit stores a plurality of programs corresponding to tasks for a robot to perform. A reception unit receives selections made by a user, which designate a task for the robot to perform and attribute information related to a program causing the robot to perform the task among the plurality of programs. An acquisition unit acquires the program for performing the task among the plurality of programs from the storage unit based on the task and the attribute information. A robot control unit controls the robot in accordance with the acquired program.

11 Claims, 8 Drawing Sheets

(56) References Cited

U.S. PATENT DOCUMENTS

| | | | |
|---|---|---|---|
| 2014/0277743 A1 | 9/2014 | Hart et al. | |
| 2015/0149263 A1* | 5/2015 | Stenneth | G07F 17/24 |
| | | | 705/13 |
| 2017/0320211 A1 | 11/2017 | Akan et al. | |
| 2018/0210432 A1 | 7/2018 | You et al. | |
| 2018/0330200 A1 | 11/2018 | Shibata et al. | |
| 2019/0047143 A1 | 2/2019 | Matsudaira et al. | |
| 2019/0213438 A1 | 7/2019 | Jones et al. | |
| 2019/0217476 A1 | 7/2019 | Jiang et al. | |
| 2020/0192710 A1* | 6/2020 | Kumar | B25J 15/0014 |
| 2020/0230817 A1 | 7/2020 | Han | |
| 2021/0031365 A1* | 2/2021 | Demirdjian | B25J 9/163 |
| 2021/0078172 A1* | 3/2021 | Cao | B25J 9/1661 |
| 2021/0178575 A1* | 6/2021 | Riek | G06Q 10/06311 |
| 2021/0213606 A1* | 7/2021 | Suzumura | B25J 13/089 |
| 2021/0224579 A1 | 7/2021 | Jones et al. | |
| 2021/0385616 A1* | 12/2021 | Nakagawa | H04W 4/029 |
| 2022/0171907 A1* | 6/2022 | Chang | G06N 3/045 |

FOREIGN PATENT DOCUMENTS

| | | | |
|---|---|---|---|
| JP | 2003-108791 A | 4/2003 | |
| JP | 2005-078519 A | 3/2005 | |
| JP | 2007-066242 A | 3/2007 | |
| JP | 2018-032126 A | 3/2018 | |
| JP | 2018-530829 A | 10/2018 | |
| JP | 2018-190241 A | 11/2018 | |
| JP | 2018-200539 A | 12/2018 | |
| JP | 2019-005834 A | 1/2019 | |
| JP | 2019-030941 A | 2/2019 | |
| JP | 2019-121364 A | 7/2019 | |
| JP | 2020017029 A | * | 1/2020 |
| WO | 2017/130286 A1 | 8/2017 | |
| WO | 2018/143607 A1 | 8/2018 | |

OTHER PUBLICATIONS

JP Office Action for JP Application No. 2021-540609, mailed on Jul. 18, 2023 with English Translation.

EP Office Action for EP Application No. 19942216.3. malled on Jul. 19, 2022.

Karan et al., "A Graphical User Interface for Tele-operated Robotic Sample Acquisition", Mechatronics and Automation (ICMA), 2012 International Conference on, IEEE, Aug. 5, 2012, pp. 1202-1207.

International Search Report for PCT Application No. PCT/JP2019/032847, mailed on Oct. 29, 2019.

EP Office Action for EP Application No. 19942216.3, mailed on Mar. 19, 2024.

* cited by examiner

ROBOT CONTROL SYSTEM, ROBOT CONTROL METHOD, AND RECORDING MEDIUM

This application is a National Stage Entry of PCT/JP2019/032847 filed on Aug. 22, 2019, the contents of all of which are incorporated herein by reference, in their entirety.

TECHNICAL FIELD

The present invention relates to a robot control system for using a robot in various environments, conveniently and at low cost.

BACKGROUND ART

In recent years, an introduction of a robot has been studied not only in factories which carry out mass production such as automobile factories, but also in various kinds of industries, against a backdrop of serious labor shortages. For example, at a physical distribution site, automation of transportation is being examined using an automated carrier called AGVs (Automated Guided Vehicles). Also, an introduction of an arm-type robot called a robot arm is examined in an assembly factory of electronic components. In the future, an examination of robot introduction will be accelerated even in industries such as a food factory, a restaurant, a hotel, a hospital, and nursing care.

Generally, robots are custom-made products. An environment where a robot is used and a task which uses the robot (carrying things, tightening screws, and the like) are set in advance, and the robot, which is highly adjusted according to the environment and the task, is constructed. This adjustment was conventionally carried out by manual programming, and caused a considerable amount of labor; however, in recent years, automation by learning using data such as deep learning has begun to advance. For example, Patent Documents 1 to 3 disclose adjustment of a robot using learning. However, even if adjusted by any method, the adjustment is limited to a robot used to adjust, an environment at an adjustment time, and a condition at the adjustment time concerning an adjusted task, and it is necessary to redo the adjustment even if any of the conditions are changed.

PRECEDING TECHNICAL REFERENCES

Patent Document

Patent Document 1: Japanese Patent Application Laid-open under No. H09-81205
Patent Document 2: Japanese Patent Application Laid-open under No. 2005-78519
Patent Document 3: Japanese Patent Application Laid-open under No. 2007-66242

SUMMARY

Problem to be Solved by the Invention

As described above, an examination of a robot introduction has been carried out in various industries; however, it is difficult to say that the introduction is advancing at a level satisfying a user. Especially, the introduction has not advanced as much as expected in food factories, restaurants, hotels, hospitals, nursing care, and the like. There are several factors that make it difficult.

In these industries, it is difficult to use robots in a specific environment. For example, in the food factory, products to be produced change on a weekly basis and lines thus need to be changed according to an amount to be produced. If the lines are changed, a layout of the robots also need to be changed. However, for the robots, changing the layout is nothing but a change in an environment. Accordingly, it is necessary to adjust the robots again. It is difficult for a user to adjust the robots on that site, and an adjustment work may be ordered to a robot integrator each time. An adjustment automation is progressing with a technology such as deep learning; however, enormous sample data are necessary to carry out the adjustment by the deep learning and it takes several months for the adjustment. That is, in a situation, in which the change occurs on a weekly basis and orders and adjustments are made each time, it is virtually the same as the robot cannot be used. This is a first factor why the introduction of robots has not progressed.

Moreover, even tasks that seem to be the same task for a human may not be the same one for a robot. For example, for a person working in the food factory, a task of "grabbing fried foods" and a task of "grabbing fried shrimps" are the same tasks in a sense of putting side dishes into a lunch box. However, these tasks are different ones for robots. The side dishes to put in the lunch box change every day and are not permanent. Accordingly, a task which the robot performs is changed each time a kind of a side dish is changed, and thus, it becomes necessary to order the adjustment of the task change to the robot integrator. This is an unrealistic situation similar to a situation of the environmental change, and makes it difficult to advance the robot introduction when the task is changed frequently. This is a second factor.

It is one object of the present invention to eliminate a need for an enormous adjustment work occurring at a time of introducing a robot, and to provide a robot control system capable of facilitating the introduction of the robot.

Means for Solving the Problem

According to an example aspect of the present invention, there is provided a robot control system including:
  a storage unit configured to store a plurality of programs corresponding to tasks for a robot to perform;
  a reception unit configured to receive selections made by a user, which designate a task for the robot to perform and attribute information related to a program causing the robot to perform the task among the plurality of programs;
  an acquisition unit configured to acquire the program for performing the task among the plurality of programs from the storage unit based on the task and the attribute information; and
  a robot control unit configured to control the robot in accordance with the acquired program.

According to another example aspect of the present invention, there is provided a robot control method including:
  receiving selections made by a user, which designate a task for a robot to perform and attribute information related to a program causing the robot to perform the task among a plurality of programs;
  acquiring the program causing the robot to perform the task among the plurality of programs from a storage unit based on the task and the attribute information, the storage unit storing the plurality of programs corresponding to tasks for the robot to perform; and controlling the robot in accordance with the acquired program.

According to still another example aspect of the present invention, there is provided a recording medium storing a program, the program causing a computer to perform a process including:

receiving selections made by a user, which designate a task for a robot to perform and attribute information related to a program causing the robot to perform the task among a plurality of programs;

acquiring the program causing the robot to perform the task among the plurality of programs from a storage unit based on the task and the attribute information, the storage unit storing the plurality of programs corresponding to tasks for the robot to perform; and controlling the robot in accordance with the acquired program.

According to still yet another example aspect of the present invention, there is provided a cloud apparatus including:

a storage unit configured to store a plurality of programs corresponding to tasks for a robot to perform;

a receiving unit configured to receive a task for the robot to perform and attribute information related to a program causing the robot to perform the task among the plurality of programs, the task and the attribute information being selected by a user;

an acquisition unit configured to acquire the program for performing the task among the plurality of programs from the storage unit based on the task and the attribute information; and a transmitting unit configured to transmit the acquired program.

Effect of the Invention

According to the present invention, it is possible to eliminate a need for enormous adjustment work occurring at a time of robot introduction, to provide a robot control system capable of facilitating the introduction of the robot.

EXAMPLE EMBODIMENTS

In the following, example embodiments of the present invention will be described with reference to the accompanying drawings.

[System Configuration]
(Overall Configuration)

Figure 1:
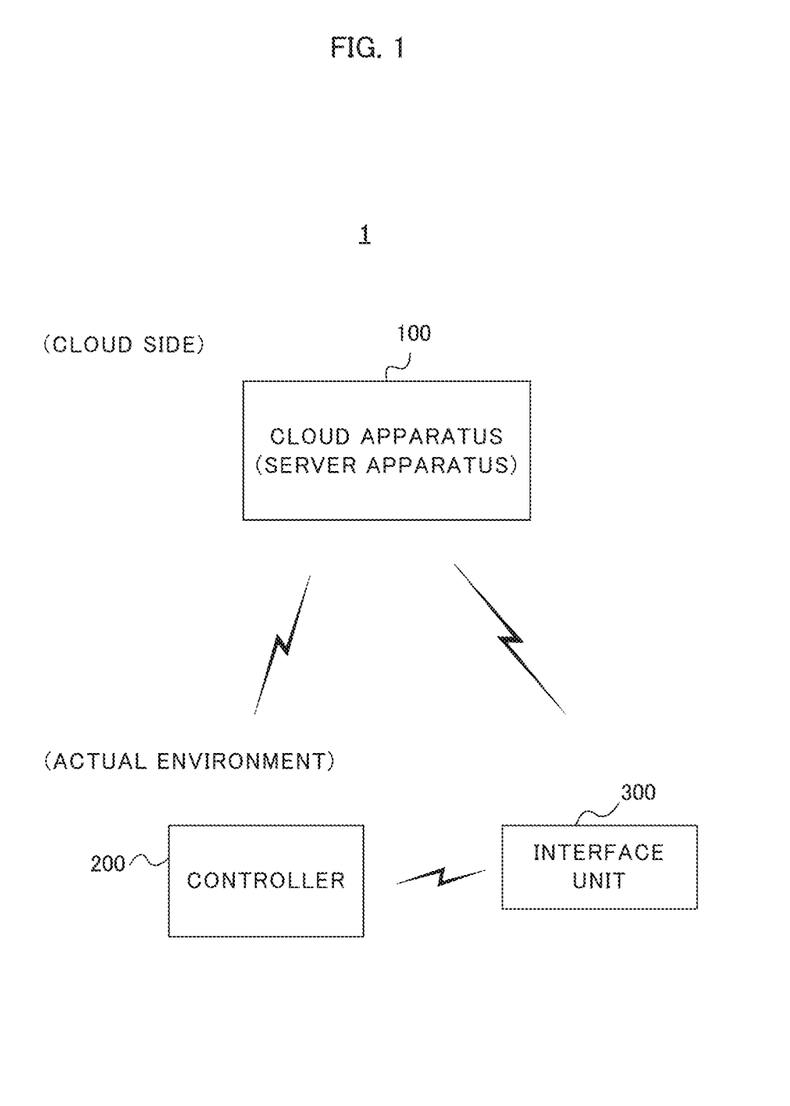
FIG. 1 is a block diagram showing an overall configuration of a robot control system.

FIG. 1 is a block diagram showing an overall configuration of a robot control system according to an example embodiment of the present invention. A robot control system 1 includes a cloud apparatus 100, a controller 200, and an interface unit 300. The cloud apparatus 100, the controller 200, and the interface unit 300 can communicate with each other by a wired or wireless network. The cloud apparatus 100 is a server apparatus installed on a cloud side. On the other hand, the controller 200 and the interface unit 300 are installed in an actual environment where a work by a robot is performed. The controller 200 is a device for controlling the robot. The interface unit 300 is operated by a user to input information necessary to control the robot. FIG. 1 illustrates a set of the controller 200 and the interface unit 300 for convenience; however, in practice, a plurality of controllers 200 and the interface units 300 are commonly used for one cloud apparatus 100.

(Hardware Configuration of Cloud Apparatus)

Figure 2A:
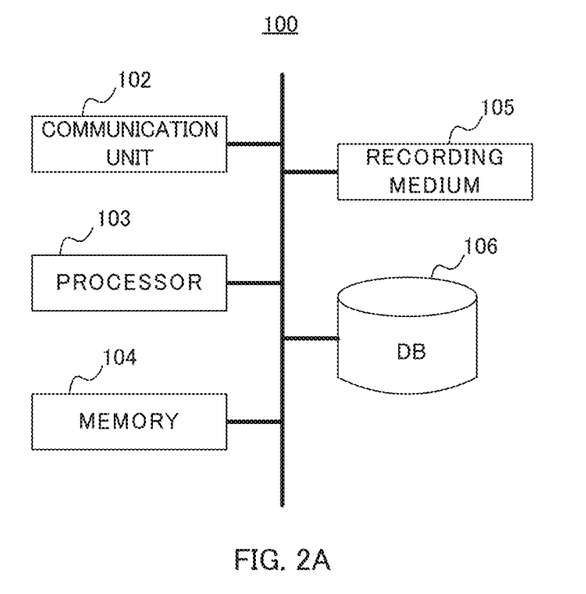
FIG. 2A and FIG. 2B are block diagrams illustrating hardware configurations of a cloud apparatus and a controller.

FIG. 2A is a block diagram illustrating a hardware configuration of the cloud apparatus 100. As illustrated, the cloud apparatus 100 includes a communication unit 102, a processor 103, a memory 104, a recording medium 105, and a database (DB) 106.

The communication unit 102 communicates with the controller 200 and the interface unit 300 through the wired or wireless network. Specifically, the communication unit 102 receives a task and attribute information of the task, which are designated by a user, from the interface unit 300. The communication unit 102 transmits a program corresponding to the task and the attribute information designated by the user to the controller 200.

The processor 103 is a computer such as a CPU (Central Processing Unit) and controls the entire cloud apparatus 100 by executing a program prepared in advance. Specifically, the processor 103 conducts a process of transmitting a program corresponding to the task and the attribute information designated by the user to the controller 200 and a process of calculating a fee generated by using the program.

The memory 104 includes a ROM (Read Only Memory), a RAM (Random Access Memory), and the like. The memory 104 stores various programs to be executed by the processor 103. The memory 104 is also used as a work memory during an execution of various processes by the processor 103.

The recording medium 105 is a non-volatile and non-transitory recording medium such as a disk-shaped recording medium, a semiconductor memory, or the like, and is removable from the cloud apparatus 100. The recording medium 105 records various programs executed by the processor 103. When the cloud apparatus 100 performs various kinds of processes, a program recorded on the recording medium 105 is loaded into the memory 104 and is executed by the processor 103.

The database 106 stores programs (hereinafter, also referred to as "task-specific programs") prepared respectively to a plurality of tasks. The database 106 stores usage histories of the task-specific programs for each user. In addition to the above, the cloud apparatus 100 may include an input apparatus such as a keyboard or a mouse for the user to perform instructions or inputs, and a display apparatus.

(Hardware Configuration of Controller)

Figure 2B:
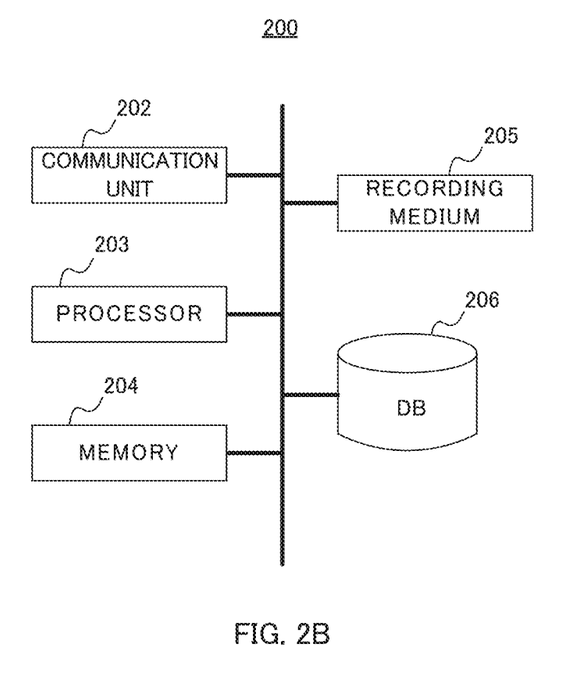

FIG. 2B is a block diagram showing a hardware configuration of the controller 200. As illustrated, the controller 200 includes a communication unit 202, a processor 203, a memory 204, a recording medium 205, and a database (DB) 206.

The communication unit 202 communicates with the cloud apparatus 100 and the interface unit 300 through a wired or wireless network. Specifically, the communication unit 202 receives the task-specific program from the cloud apparatus 100. If necessary, the communication unit 202 transmits a task-specific program learned in the controller 200 or a new task-specific program generated in the controller 200 to the cloud apparatus 100.

The processor 203 is a computer such as a CPU or the CPU with a GPU (Graphics Processing Unit), and controls the entire controller 200 by executing a program prepared in advance. Specifically, the processor 203 conducts a process of controlling the robot by executing the task-specific program, a process of learning the task-specific program, a process of generating a new task-specific program, and the like.

The memory 204 includes a ROM, a RAM, and the like. The memory 204 stores various programs to be executed by the processor 203. Also, the memory 204 is used as a work memory during an execution of various processes by the processor 203.

The recording medium 205 is a non-volatile and non-transitory recording medium such as a disk-shaped recording medium, a semiconductor memory, or the like, and is removably configured with respect to the controller 200. The recording medium 205 records various programs executed by the processor 203. When the controller 200 performs various processes, a program recorded on the recording medium 205 is loaded into the memory 204 and is executed by the processor 203.

The database 206 stores data used in the controller 200 to learn the task-specific program. In addition to the above, the controller 200 may include an input apparatus such as a keyboard or a mouse and a display apparatus.

First Example Embodiment

Figure 3:
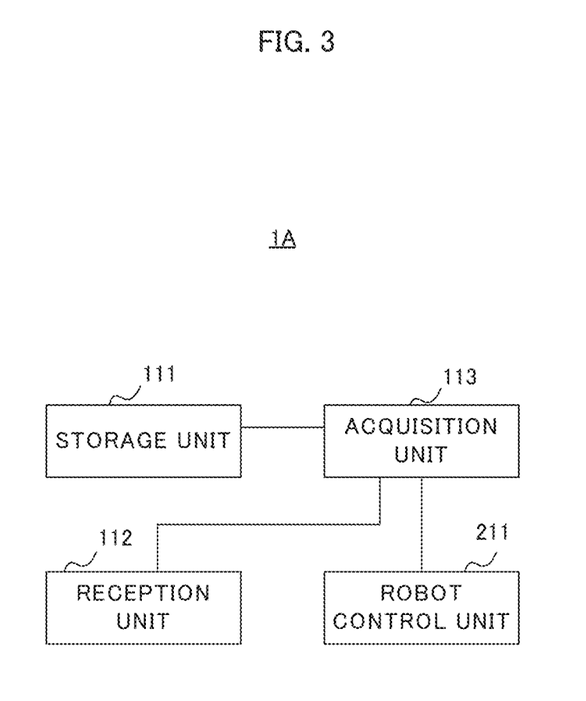
FIG. 3 is a block diagram illustrating a functional configuration of a robot control system according to a first example embodiment.

FIG. 3 illustrates a functional configuration of a robot control system 1A according to a first example embodiment. As illustrated, the robot control system 1A includes a storage unit 111, a reception unit 112, an acquisition unit 113, and a robot control unit 211.

In the present example embodiment, it may be one feature in that a program for controlling a robot is divided for each task and is supplied to the robot control unit 211 as the task-specific program. A "task" is a target that the robot realizes upon completion of operation. For example, in a case of an arm-type robot (hereinafter, also referred to as "robot arm"), there is "carrying an object to be subject", "tightening a screw" or the like as a task. In this case, the "carrying an object to be a subject" means moving the object from one point to another point. The "carrying an object to be a subject" is generally a basic operation of the robot arm called "pick and place". There are various objects as the "objects to be a subject"; for example, in a case of a food factory, an object which the robot needs to carry such as a "fried food" and a "fried shrimp" may be the "object to be a subject". On this system, a task is defined as a verb and an object of the verb is defined as attribute information.

As described earlier, for robots, the task of "carrying fried shrimps" and the task of "carrying fried foods" are different tasks. Accordingly, the programs for executing these tasks are formed as different programs. On the other hand, on the system, usability of a user is considered, and these tasks are treated as the same ones but attribute information is different for each task. That is, on the system, the task of "carrying fried shrimps" and the task of "carrying fried foods" are treated as the same as a task of "carrying an object to be a subject (pick and place)", and the "fried shrimps" and the "fried foods" are treated as different attribute information.

The storage unit 111 stores the task-specific program described above for a plurality of tasks. The reception unit 112 receives selections of a task and the attribute information, which are conducted by the user. For example, the user operates the interface unit 300 and specifies a task to be executed by the robot and attribute information related to the task-specific program that executes the task. The reception unit 112 receives the selections of the task and the attribute information made by the user from the interface unit 300.

The acquisition unit 113 acquires a task-specific program for executing a task from the storage unit 111 based on the task and the attribute information selected by the user, and provides the task-specific program to the robot control unit 221. The robot control unit 211 executes the provided task-specific program to control the robot. Hence, by selecting the program prepared and the attribute information for each task, it becomes possible to make the robot execute a desired task.

In one preferred example, the storage unit 111, the reception unit 112, and the acquisition unit 113 are in the cloud apparatus 100, and the robot control unit 211 is in the controller 200. In this case, the acquisition unit 113 transmits the task-specific program acquired from the storage unit 111 to the robot control unit 211 of the controller 200. On the other hand, in another preferred example, all of the storage unit 111, the reception unit 112, the acquisition unit 113, and the robot control unit 211 may be arranged inside the controller 200. In this case, the task-specific program, which is downloaded from the cloud apparatus 100 in advance, is stored in the storage unit 111 in the controller 200.

Second Example Embodiment

Figure 4:
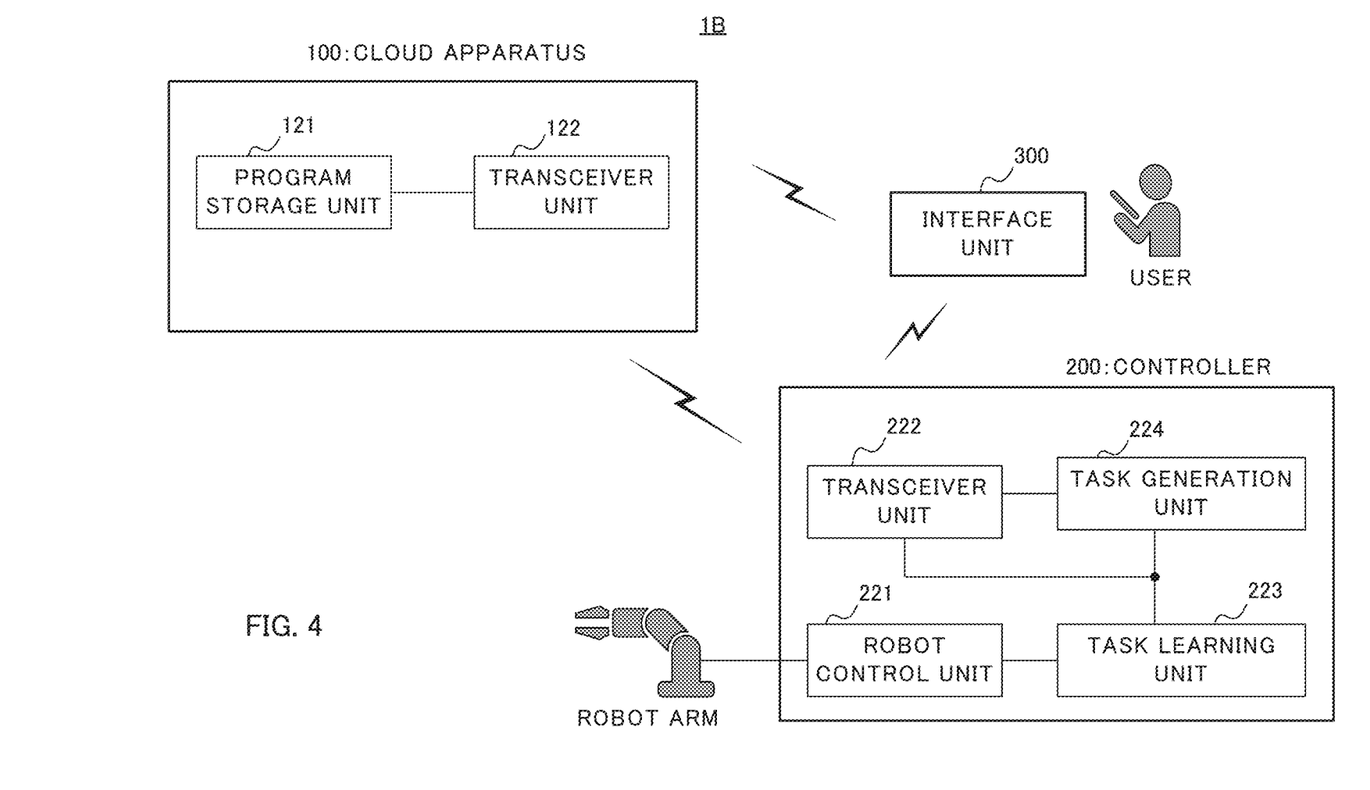
FIG. 4 is a block diagram illustrating a functional configuration of a robot control system according to a second example embodiment.

Next, a second example embodiment of the present invention will be described. FIG. 4 is a block diagram showing a functional configuration of a robot control system 1B according to the second example embodiment. As illustrated, the cloud apparatus 100 includes a program storage unit 121 and a transceiver unit 122. Moreover, the controller 200 includes a robot control unit 221, a transceiver unit 222, a task learning unit 223, and a task generation unit 224.

In the cloud apparatus 100, the program storage unit 121 stores task-specific programs concerning a plurality of tasks in the same manner as the storage unit 111 in the first example embodiment. The transceiver unit 122 receives a task and attribute information designated by a user from the interface unit 300. The transceiver unit 122 acquires a task-specific program corresponding to the task designated by the user from the program storage unit 121 and transmits the task-specific program to the controller 200.

The interface unit 300 is a device for acquiring user's desired selections. The user views a display of the interface unit 300, and selects a desired task and desired attribute information using a finger or an input device such as a dedicated pen or a mouse. Information entered by the user is transmitted to the cloud apparatus 100 through a communication network.

Figure 5:
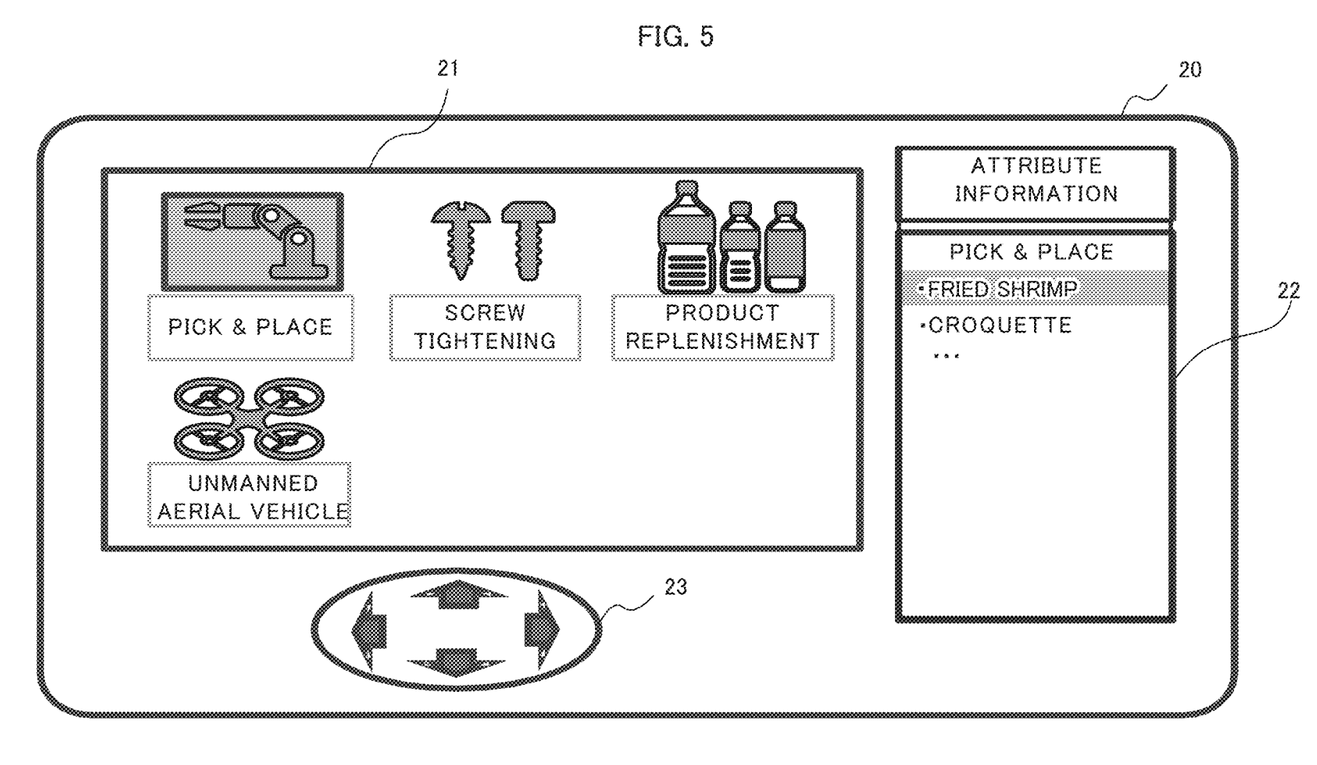
FIG. 5 illustrates a display example of an interface unit.

FIG. 5 illustrates an example of the interface unit 300. In this example, the interface unit 300 may be a tablet terminal. The interface unit 300 displays at least the task and the attribute information. In the example of FIG. 5, a task window 21, an attribute information window 22, and an operation part 23 are displayed on the display unit 20 of the tablet terminal. By operating the operation part 23, the user selects a task by indicating an icon displayed in the task window 21, and selects attribute information displayed in the attribute information window 22. In this example, since the user has selected "PICK & PLACE" as the task, the attribute information window 22 displays "FRIED SHRIMP", "CROQUETTE", and the like as objects of the "PICK & PLACE". In response to selections of a task and attribution information and a transmission instruction by the user, the interface unit 300 transmits the task and the attribute information selected by the user to the cloud apparatus 100.

The robot control unit 221 gives a motion instruction to a robot. In the example of FIG. 4, a robot arm is exemplified as the robot. The transceiver unit 222 of the controller 200 downloads the task-specific program associated with the task and the attribute information selected by the user in the interface unit 300, through the communication network from the cloud apparatus 100. Basically, the controller 200 may download a necessary task-specific program each time. However, instead, the controller 200 may implement or download all task-specific programs stored in the program storage unit 121 of the cloud apparatus 100 to the controller 200 in advance, acquire the task and the attribute information selected by the user from the interface unit 300, and activate a corresponding task-specific program.

In the controller 200, the robot control unit 221 outputs a motion instruction calculated by the task-specific program to finally operate the robot (the robot arm in the present example embodiment). The motion instruction may be generally a posture of the robot arm, torque of an actuator (a motor or the like) or the like. The motion instruction can be considered as a signal to move the robot. The robot control unit 221 may output the motion instruction directly to the actuator forming the robot arm. Also, in a case where the robot arm includes an own controller, the robot control unit 221 may convert the motion instruction calculated by the task-specific program into an output for the own controller, and may output it to the own controller.

The task-specific programs incorporated in the above-described configuration will be executed by robots placed in various environments. In this case, it is preferable to adjust the program in the environment where the robot is placed. Therefore, in the present example embodiment, the task learning unit 223, which adjusts the task-specific program for the environment where the robot is placed, is provided.

The task-specific program, which has been learned by the task learning unit 223, is appropriately transmitted to and updated to the robot control unit 221. A feature of the task learning unit 223 in the present example embodiment is that the robot includes a function for learning while avoiding the robot from hitting an obstacle. In a general learning algorithm, the robot learns appropriate movements while hitting with obstacles around the robot (that is, objects in a surrounding environment). Therefore, it is difficult to conduct re-learning under an environment where the robot is placed on a site and has worked. This is because the robot may damage an object in a surrounding, or may interfere with a work of another robot arm if that object is another robot arm. Moreover, in an environment where people are around the robot, the robot may hurt the people or interfere with a work of the people.

In the present example embodiment, in order to improve this matter, a task learning unit 223, which can perform learning while avoiding an obstacle, is provided. By this configuration, in an environment where the robot actually operates, without making an adjustment in advance, it is possible to provide a new structure for utilizing the robot by simply downloading a necessary task-specific program to the robot.

Specifically, as a structure for learning while avoiding obstacles, the task learning unit 223 uses an algorithm as follows. Now, the following function is defined as an interference function B(x).

[Math 1]

$$\begin{cases} B(x) > 0 : \text{position of control target device is outside obstacle} \\ B(x) = 0 : \text{position of control target device is on surface of obstacle} \\ B(x) < 0 : \text{position of control target device is inside obstacle} \end{cases} \quad (1)$$

Here, the "control target device" is a robot or an unmanned vehicle to be controlled, and a robot arm is depicted in the example of FIG. 4. "x" denotes a state vector of the control target device. If "u" denotes an input vector to the actuator of the robot, the input vector of the robot moving avoiding an obstacle is obtained by the following optimization calculation.

[Math 2]

$$u^* = \underset{u}{\operatorname{argmin}} u^T P u \quad (2)$$

$$\text{s.t. } \Delta B(x, u) + \gamma B(x) > 0$$

$$0 < \gamma \le 1$$

Here, 'u*' denotes an optimal input vector, 'P' denotes a matrix for creating an evaluation function for u, $\Delta B(x,u)$ denotes a variation of B(x) per unit step, and y denotes a coefficient. The task learning unit 223 obtains the optimum input vector u* that minimizes the evaluation function described in '$u^T P u$' (a quadratic form of u in this case) and inputs the optimum input vector u* to the robot, so that the robot operates by avoiding an obstacle. The matrix P can be set in various ways; however, the matrix P is often set to be related to a level of achievement of a task.

In the above algorithm, a robot movement depends on the matrix P. However, there are many cases where it is not known whether the matrix P itself is suitable from the beginning. Therefore, the mechanism of learning is also introduced.

In order to learn, a reward for learning is necessary and the reward needs to be defined. For example, in a case where a robot arm performs a task of "extending a hand of the robot arm to a certain point A while keeping a distance as far as possible from an obstacle," the closer the hand of the robot arm approaches to the point A and the larger the physical distance to the obstacle, the higher the reward may be defined. Here, the reward is given in that a higher value of the reward indicates a more preferable movement; however of course, the reward may be given in that a lower value of the reward is the more preferable movement.

Figure 6:
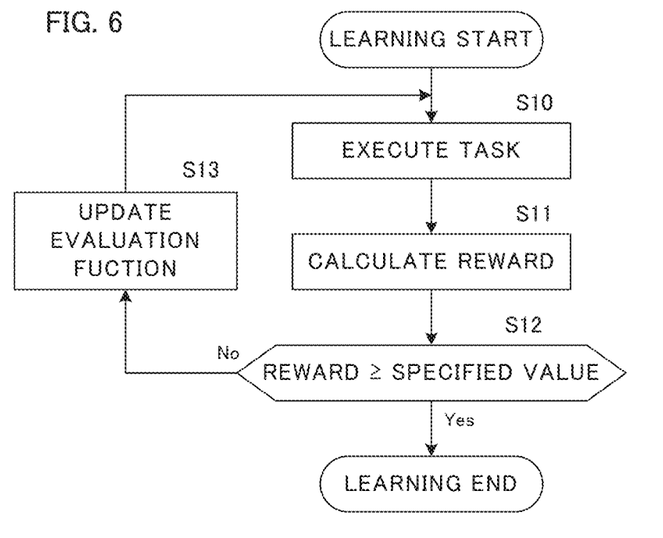
FIG. 6 illustrates a sequence of learning by a task learning unit.

FIG. 6 illustrates a sequence of the learning by the task learning unit 223. First, the task learning unit 223 executes a task (step S10). Next, the task learning unit 223 calculates a reward for executing the task (step S11). In the above example, the task learning unit 223 calculates the reward based on a distance between the hand of the robot arm and the point A and the distance between the hand of the robot arm and the obstacle.

Next, the task learning unit 223 determines whether or not the calculated reward is equal to or greater than a specified value defined in advance (step S12). When the reward is equal to or higher than the specified value (step S12: Yes), the task learning unit 223 terminates the learning. On the other hand, when the reward is not equal to or higher than the specified value (step S12: No), the task learning unit 223 updates an evaluation function by updating the matrix P with a certain update rule (step S13), and then returns to step S10 to repeat steps S10 to S12. By performing this loop, the matrix P, which can execute the task suitable for an environment, is learned, so that the robot can execute the task with an optimum movement.

An update of the matrix P corresponds to an update of elements (parameters) forming the matrix P in accordance with the certain update rule. In a case where the update rule is well designed, a learning time becomes faster. However, in a case not considering the learning time, a method of randomly changing the parameters in small increments may be used. It is repeated that the parameters are update, the reward is improved, and the parameters are thus applied.

The controller 200 may upload the matrix P obtained by the learning of the task learning unit 223 to the cloud apparatus 100, and the cloud apparatus 100 may store the received matrix P in the program storage unit 121. In this case, the matrix P is stored as the attribute information of the task together with a user name. Also, this information may be viewed or downloaded by other users.

The task generation unit 224 is used to create a task newly defined by the user. The user defines a movement of a robot through the interface unit 300. For this definition of the movement, a teaching method of a posture adopted in many robot arms may be used. In a case of a complex task, first, the task generation unit 224 may create a basic movement and then may activate the task learning unit 223, so that the robot itself learns. By these operations, it is possible to define an optimal task. The user can also upload a task-specific program and attribute information related to the newly created task to the cloud apparatus 100, store them in the program storage unit 121, and share them with other users.

For example, the user inputs voice to a voice input receiving unit of a terminal that functions as the interface unit 300. The task generation unit 224 can create a task and attribute information by performing a natural language process on the input voice and recognizing the task and the attribute information. The interface unit 300 may also display a tab for selecting the natural language which the user uses, and the user may select a desired language and input voice.

Figure 7:
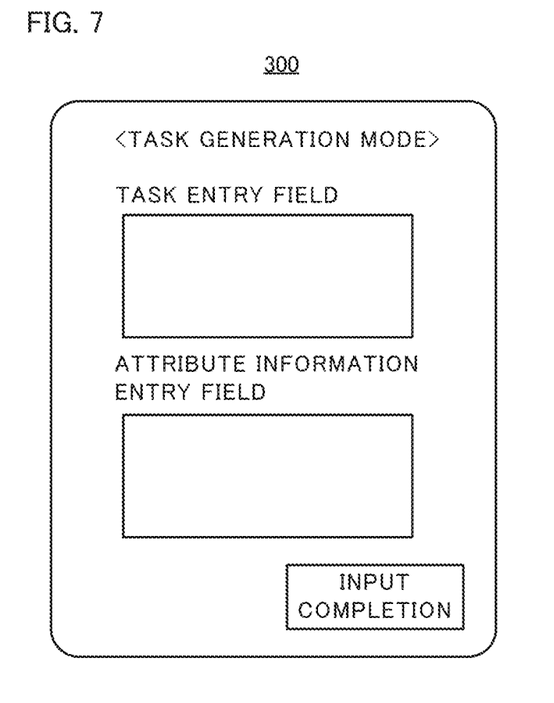
FIG. 7 illustrates a display example of the interface unit in a task generation mode.

Moreover, for example, as illustrated in FIG. 7, the user can create a task by entering the task and the attribute information to be created in a task entry field and an attribute information entry field on a display screen of the interface unit 300 with sentences of the natural language and by pressing an input completion button with a finger or a touch pen. A tab for selecting the natural language to be used may also be displayed, and the user may select and enter the desired language.

As described above, in the present example embodiment, by a feature of having a mechanism that divides a program on a task basis and learns without destroying itself and surroundings by avoiding an obstacle, it is possible for the user to utilize a robot only by paying a user fee for only tasks the user needs. Furthermore, since the user can improve the movement of the robot, and can share the newly created task-specific program with others by uploading it to the cloud apparatus 100, it is possible to generate the task-specific program at speed exceeding a speed at which a particular manufacturer supplies a program. Due to this advantage, a base of a robot utilization expands greatly, and manpower-saving robots is able to be introduced in various industries that suffer from human resource shortages.

Third Example Embodiment

Figure 8:
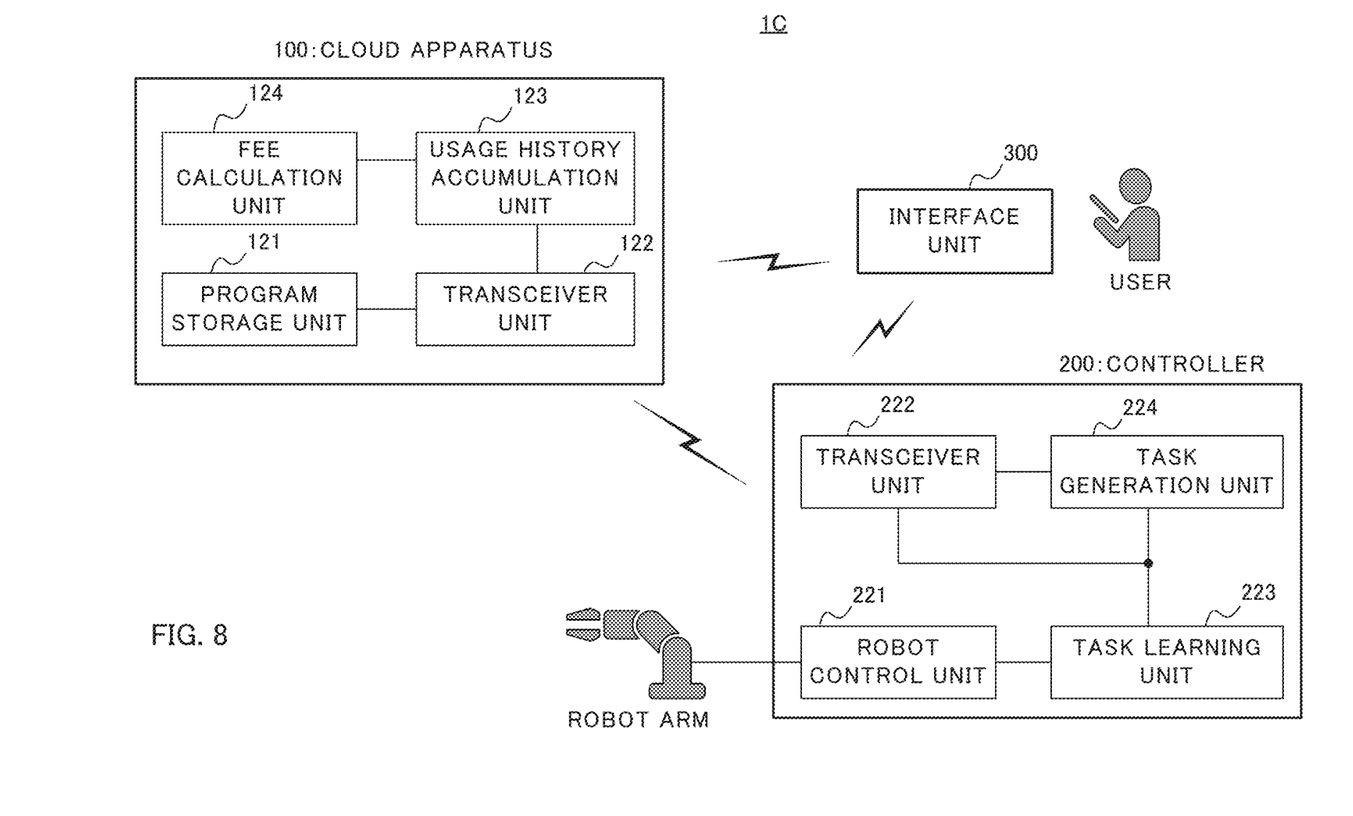
FIG. 8 is a block diagram illustrating a functional configuration of a robot control system according to a third example embodiment.

Next, a third example embodiment of the present invention will be described. FIG. 8 is a block diagram illustrating a functional configuration of a robot control system 1C according to a third example embodiment. As illustrated, the cloud apparatus 100 includes the program storage unit 121, the transceiver unit 122, a usage history accumulation unit 123, and a fee calculation unit 124. The configuration of the controller 200 is the same as that of the second example embodiment.

In the third example embodiment, for a case in that a user downloads and uses a task-specific program from the cloud apparatus 100, the cloud apparatus 100 includes a function of billing. The usage history accumulation unit 123 records usage histories of the task-specific program for each user. Specifically, the usage histories may include a number of downloads of the program and a usage time of the program. The number of downloads of the program is acquired from the program storage unit 121. The usage time of the program is obtained by communications from the robot control unit 221 of the controller 200. In the example of FIG. 8, the usage history accumulation unit 123 is implemented in the cloud apparatus 100; however, the usage history accumulation unit 123 may be implemented in a local server.

The fee calculation unit 124 calculates a fee to be charged for each user based on usage histories of a program for the user, which is accumulated in the usage history accumulation unit 123. A billing method of the fee may be a volume-based billing proportional to the number of downloads and an amount of the program usage time, or may be a flat rate billing for the number of downloads or the program usage time within respective predetermined ranges. The fee calculation unit 124 internally retains a certain formula or a logic, and calculates a fee to be billed for each user. Information indicating the calculated fee can be transmitted to the interface unit 300 and displayed to the user.

Moreover, when the user generates a new task-specific program using the function of the task generation unit 224 and provides the new task-specific program to the cloud apparatus 100, the usage history accumulation unit 123 may record history information concerning those user's operations, and the fee calculation unit 124 may calculate a fee in consideration of the history information. For example, the fee calculation unit 124 may discount the fee or may provide an incentive such as a financial reward to the user who uploaded the new task-specific program. As an incentive, for example, a monetary reward, a discount coupon, a free coupon, or the like may be considered.

Modifications

In the above example embodiment, it is possible to apply the following modifications.

Modification 1

The interface unit 300 illustrated in FIG. 5 is an example, and an application of the present invention is not limited to this example. For instance, in FIG. 5, the example in which the interface unit 300 is implemented in a tablet terminal is illustrated; however, the interface unit 300 may be implemented in a personal computer, a smartphone, or the like.

Also, in FIG. 5, a cross key displayed on the display screen is described as an example of the operation part 23; however, a selection operation from the user is not limited to this operation using a cross key. For example, the user may perform a selection operation with a mouse pointer displayed on the screen. Moreover, in a case where the interface unit 300 includes a touch panel, the user can perform a selection operation with a finger or a touch pen.

Modification 2

FIG. 4 illustrates the robot arm as a robot; however, the robot can be anything as well as the robot arm. For example, as the robot, an unmanned vehicle (an unmanned vehicle such as a car or a ship) of a vehicle type, a drone, or the like can also be used. In a case of a robot of the vehicle type, as a task, "move OO" is conceivable. Here, a paved road, a rough road, or the like is set in "OO" as the attribute information. A motion instruction to the robot is different between moving on a paved road and moving on the rough road. In this case, an output of the robot control unit may indicate torque of a wheel, speed of a vehicle, acceleration, or the like. The robot control unit may perform an output tailored to an interface of each robot so as to operate the robot.

Modification 3

Since the task learning unit 223 is used with respect to all tasks, the task learning unit 223 is usually implemented in the controller 200 as illustrated in FIG. 4. However, it is also possible to perform the learning of a task on a cloud apparatus side, and the task learning unit may be implemented in the cloud apparatus. In this case, the task learning unit provided in the cloud apparatus may acquire information for the learning from the robot control unit through the communication network and may perform the learning.

Example

Next, a description will be given of a specific example to which the present invention is applied. In this example, the robot control system according to the third example embodiment illustrated in FIG. 8 is built, and is introduced into three user companies (A company, B company, and C company) of food factories. It is assumed that each of the three user companies owns the controller 200 and the interface unit 300, and utilizes in common one cloud apparatus 100.

At a service release, the food factory A company desired to use a robot only for picking fried shrimps. The food factory B company and the food factory C company desired to use a robot for picking fried shrimps and croquettes. Hence, as the robot control system, a task of "pick and place" by a robot arm was prepared in the cloud apparatus 100, and items of "fried shrimp" and "croquette" were prepared as the attribute information. As task-specific programs, two types of "pick and place fried shrimps" and "pick and place croquettes" were prepared.

One unit of the robot arm is leased to each company for 100,000 yen per month. Also, as a rate plan for using a task-specific program, two types are prepared: a flat rate billing allowing using up to five programs for 50,000 yen per month, and a volume-based billing of one program for 30,000 yen per month. The A company selects the volume-based billing, while the B company and the C company select the flat rate billing.

Figure 9:
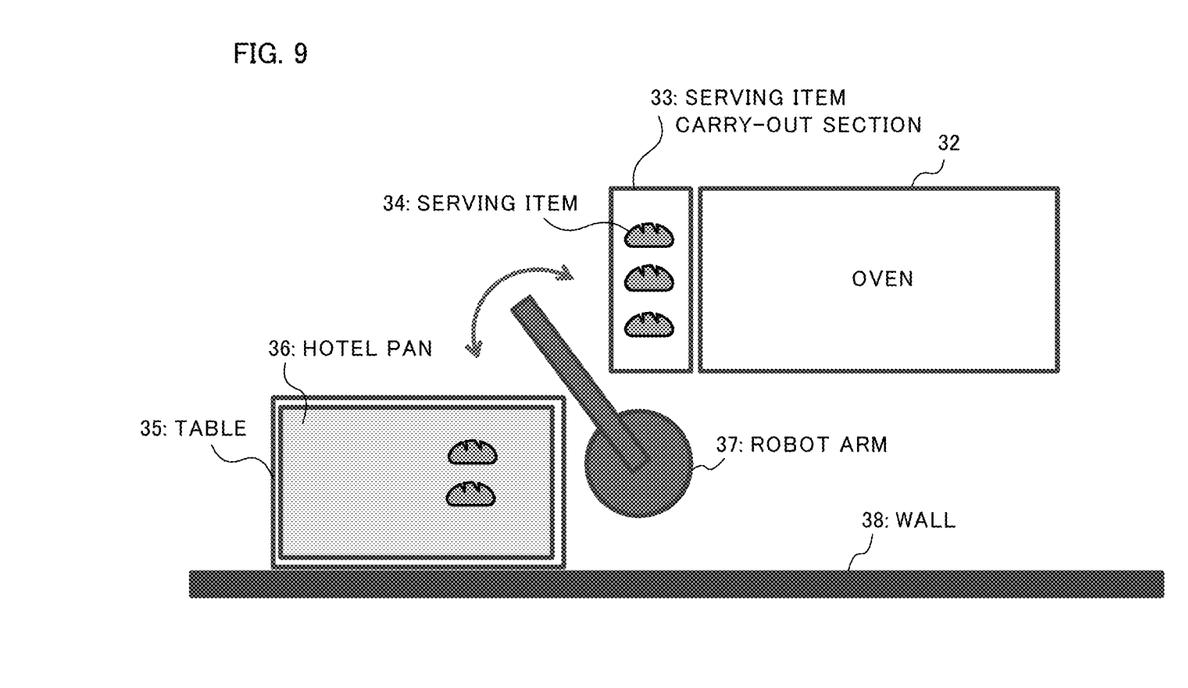
FIG. 9 is a plan view of a workplace for a robot according to an example.

Each company downloaded the task-specific program after the robot arm was installed, and carried out picking operations of fried shrimps and croquettes. FIG. 9 illustrates a schematic view of a workplace for the "pick and place". FIG. 9 is a plan view of the workplace as viewed from above. A robot arm 37 aligns serving items 34 warmed by an oven 32, that is, fried shrimps or croquettes, in the hotel pan 36 on a table 35 next to the oven 32. Each company has the same outline of the workplace, the table 35 is approximately the same size as the hotel pan 36, and a wall 38 at a side of the hotel pan 36 is opposite to the oven 32; accordingly, the robot control unit 221 needs to be careful regarding a collision of the robot arm 37 with the wall 38. However, the hotel pan 36 for each company is different in size. Two hotel pans 36 of 654 mm×530 mm are aligned in the A company, one hotel pan 36 of 654 mm×530 mm aligned in the B company, and one hotel pan 36 of 3278265 mm in the C company.

After the program was downloaded from the cloud apparatus 100, each company was able to immediately carry out the "pick and place" operation of the fried shrimps or the croquettes without any problems and hitting the wall. In addition, immediately after a start of the operation, the robot arm 37 took an anxious posture such as approaching the wall 38 upon taking a posture for avoiding an obstacle; however, the robot arm 37 gradually carried out an on-line learning, and was able to complete a work keeping an appropriate distance from the wall 38 after dozens of times of operations. As a reward of the learning, a reward function was set so as to be higher in a case of approaching a position where an object is placed and being 100 mm away from a wall.

After that, the C company created a task of the "pick and place" of fried foods using the task generation unit 224 by operating the interface unit 300. Furthermore, in the C company, the "pick and place" operation of the fried foods is carried out in an environment of the C company, and an optimal operation of the robot arm is realized using the task learning section 223. Then, the C company uploaded its own program and learning information to the program storage unit 121 of the cloud apparatus 100.

After that, the A company needed to add a task of the "pick and place" of fried foods. First, the A company changed a contract from a volume-based billing to a flat rate system. Then, the A company downloaded the task-specific program for the "pick and place" of fried foods, which the C company prepared and provided to the cloud apparatus 100, and added the operation. Also, in the A company, the task-specific program for the "pick and place" of fried foods prepared by the C company worked well.

Since the task-specific program for the "pick and place" of fried foods, which the C company uploaded, was downloaded by other companies, as an incentive, 50,000 yen was cashed back to the C company.

As described above, using the robot control system according to the example embodiments, it becomes possible for a plurality of companies to easily introduce robots. Usually, it is said that an introduction of the robot arm costs 5 million yen to 10 million yen including an adjustment system integration and a period takes from half a year to one year. With this system, the introduction cost and time have been significantly reduced. Moreover, since this system includes a structure and an incentive to share task-specific programs among user companies of the system, the system can also be used as a revenue source by uploading the task-specific programs to be used by many other companies. The greater the number of companies participating in this system, the greater the benefits that participants can enjoy.

In the above-described example, only the "pick and place" is described as a task; however, another task such as "cutting food" can also be used universally. Moreover, in the above-described example, the food factory case has been illustrated; however, it can be used for general purposes in other industries such as assembly factories, and can handle a "screw tightening" task peculiar to the assembly factories. Note that the rate system and the incentive in the above example are illustrated as examples, and various rate systems and incentives are considered. For instance, as the rate system, a number of times the service has been used (that is, a number of downloads of a program and a usage time of the program) and a system for billing a fee according to a usage period (subscription method) or the like may be considered.

A part or all of the example embodiments described above may also be described as the following supplementary notes, but not limited thereto.

Supplementary Note 1

1. A robot control system comprising:
a storage unit configured to store a plurality of programs corresponding to tasks for a robot to perform;
a reception unit configured to receive selections made by a user, which designate a task for the robot to perform and attribute information related to a program causing the robot to perform the task among the plurality of programs;
an acquisition unit configured to acquire the program for performing the task among the plurality of programs from the storage unit based on the task and the attribute information; and
a robot control unit configured to control the robot in accordance with the acquired program.

Supplementary Note 2

2. The robot control system according to supplementary note 1, wherein the plurality of programs are prepared for each task.

Supplementary Note 3

3. The robot control system according to supplementary note 1 or 2, wherein the robot control unit determines a control with respect to the robot by using an evaluation function.

Supplementary Note 4

4. The robot control system according to any one of supplementary notes 1 through 3, further comprising:
a usage history accumulation unit configured to accumulate usage histories of the acquired program for each user; and
a fee calculation unit configured to calculate a usage fee of the acquired program for each user based on the usage histories.

Supplementary Note 5

5. The robot control system according to supplementary note 4, wherein the fee calculation unit calculates a fee defined in advance in a case where an amount used to calculate the fee is within a predetermined range.

Supplementary Note 6

6. The robot control system according to supplementary note 4, wherein the fee calculation unit calculates a flat rate according to a usage period.

Supplementary Note 7

7. The robot control system according to any one of supplementary notes 1 through 6, further comprising a learning unit configured to learn an environment around the robot that is controlled by executing the acquired program and to update the acquired program.

Supplementary Note 8

8. The robot control system according to supplementary note 7, wherein the learning unit improves an execution level of the task by operating the robot while avoiding the robot from hitting an obstacle.

Supplementary Note 9

9. The robot control system according to supplementary note 7 or 8, wherein the storage unit stores a program learned by the learning unit.

Supplementary Note 10

10. The robot control system according to any one of supplementary notes 1 through 9, wherein the storage unit stores a program concerning a task created by the user.

Supplementary Note 11

11. The robot control system according to any one of supplementary notes 4 through 6, wherein the fee calculation unit is configured to decrease the fee to charge the user or to give an incentive to the user, in response to storing a program concerning the task created by the user.

Supplementary Note 12

12. The robot control system according to supplementary note 1, wherein
the storage unit is placed on a cloud; and
the storage unit and the robot control unit are communicably connected to each other.

Supplementary Note 13

13. A robot control method comprising:
receiving selections made by a user, which designate a task for a robot to perform and attribute information related to a program causing the robot to perform the task among a plurality of programs;
acquiring the program causing the robot to perform the task among the plurality of programs from a storage unit based on the task and the attribute information, the storage unit storing the plurality of programs corresponding to tasks for the robot to perform; and
controlling the robot in accordance with the acquired program.

Supplementary Note 14

14. A recording medium storing a program, the program causing a computer to perform a process comprising:
receiving selections made by a user, which designate a task for a robot to perform and attribute information related to a program causing the robot to perform the task among a plurality of programs;
acquiring the program causing the robot to perform the task among the plurality of programs from a storage unit based on the task and the attribute information, the storage unit storing the plurality of programs corresponding to tasks for the robot to perform; and
controlling the robot in accordance with the acquired program.

Supplementary Note 15

15. A cloud apparatus comprising:
a storage unit configured to store a plurality of programs corresponding to tasks for a robot to perform;
a receiving unit configured to receive a task for the robot to perform and attribute information related to a program causing the robot to perform the task among the plurality of programs, the task and the attribute information being selected by a user;
an acquisition unit configured to acquire the program for performing the task among the plurality of programs from the storage unit based on the task and the attribute information; and
a transmitting unit configured to transmit the acquired program.

While the invention has been described with reference to the example embodiments and examples, the invention is not limited to the above example embodiments and examples. It will be understood by those of ordinary skill in the art that various changes in form and details may be made therein without departing from the spirit and scope of the present invention as defined by the claims.

DESCRIPTION OF SYMBOLS 1, 1A, 1B, 1C Robot control system
100 Cloud apparatus
121 Program storage unit
122 Transceiver unit
123 Usage history accumulation unit
124 Fee calculation unit
200 Controller
221 Robot control unit
222 Transceiver unit
223 Task learning unit
224 Task generation unit
300 Interface unit

What is claimed is:
1. A robot control system comprising:
a memory storing instructions; and
one or more processors configured to execute the instructions to:
store a plurality of programs in the memory, the plurality of programs corresponding to tasks for an arm-type robot;
receive selections made by a user, which designate a task for the robot to perform and attribute information related to a target program causing the robot to perform the task, from among the plurality of programs;
acquire the target program for performing the task from the memory based on the task and the attribute information;
control the robot in accordance with the target program as has been acquired; and
perform learning of an environment of the robot while the robot is controlled by executing the target program and while preventing the robot from hitting an obstacle, to update the target program,
wherein the learning is performed based on an optimization algorithm,
wherein the optimization algorithm uses an interference function indicating an interference state between the obstacle and the robot, and
wherein the optimization algorithm includes a constraint indicating that the robot is not to hit the obstacle.

2. The robot control system according to claim 1, wherein the task is one of a plurality of tasks, and the plurality of programs are prepared for each task.

3. The robot control system according to claim 1, wherein the processor is configured to determine a control with respect to the robot by using an evaluation function.

4. The robot control system according to claim 1, wherein the processor further configured to:
accumulate usage histories of the target program that has been acquired, for each of a plurality of the users; and
calculate a usage fee of the target program for each user based on the usage histories.

5. The robot control system according to claim 4, wherein the processor calculates a fee defined in advance in a case where an amount used to calculate the fee is within a predetermined range.

6. The robot control system according to claim 4, wherein the processor calculates a flat rate according to a usage period.

7. The robot control system according to claim 1, wherein the memory stores the target program as has been updated.

8. The robot control system according to claim 1, wherein the target program is created by the user.

9. The robot control system according to claim 4, wherein the processor is configured to decrease the usage fee to charge the user or to give an incentive to the user, in a case where the target program is created by the user.

10. A robot control method by performed by a computer and comprising:
storing a plurality of programs in a memory, the plurality of programs corresponding to tasks for an arm-type robot;
receiving selections made by a user, which designate a task for the robot to perform and attribute information related to a target program causing the robot to perform the task, from among the plurality of programs;

acquiring the target program for performing the task from the memory based on the task and the attribute information;

controlling the robot in accordance with the target program as has been acquired; and performing learning of an environment of the robot while the robot is controlled by executing the target program and while preventing the robot from hitting an obstacle, to update the target program, wherein the learning is performed based on an optimization algorithm, wherein the optimization algorithm uses an interference function indicating an interference state between the obstacle and the robot, and wherein the optimization algorithm includes a constraint indicating that the robot is not to hit the obstacle.

11. A non-transitory computer-readable recording medium storing instructions executable by a computer to perform a process comprising:

storing a plurality of programs in a memory, the plurality of programs corresponding to tasks for an arm-type robot;

receiving selections made by a user, which designate a task for the robot to perform and attribute information related to a target program causing the robot to perform the task, from among the plurality of programs;

acquiring the target program for performing the task from the memory based on the task and the attribute information;

controlling the robot in accordance with the target program as has been acquired; and performing learning of an environment of the robot while the robot is controlled by executing the target program and while preventing the robot from hitting an obstacle, to update the target program, wherein the learning is performed based on an optimization algorithm, wherein the optimization algorithm uses an interference function indicating an interference state between the obstacle and the robot, and wherein the optimization algorithm includes a constraint indicating that the robot is not to hit the obstacle.

* * * * *